(12) United States Patent
Motoyama

(10) Patent No.: US 8,015,881 B2
(45) Date of Patent: Sep. 13, 2011

(54) PRESSURE SENSOR

(75) Inventor: Hisao Motoyama, Minamisoma (JP)

(73) Assignee: Epson Toyocom Corporation (JP)

( * ) Notice: Subject to any disclaimer, the term of this patent is extended or adjusted under 35 U.S.C. 154(b) by 94 days.

(21) Appl. No.: 12/409,942

(22) Filed: Mar. 24, 2009

(65) Prior Publication Data

US 2009/0241679 A1    Oct. 1, 2009

(30) Foreign Application Priority Data

Mar. 25, 2008   (JP) .................. 2008-077415
Jun. 11, 2008   (JP) .................. 2008-152551
Jan. 15, 2009   (JP) .................. 2009-006884

(51) Int. Cl.
*G01L 9/00* (2006.01)
(52) U.S. Cl. .......................................... 73/717
(58) Field of Classification Search .......... None
See application file for complete search history.

(56) References Cited

U.S. PATENT DOCUMENTS

| | | | |
|---|---|---|---|
| 3,374,677 A * | 3/1968 | Corp et al. ............... 73/723 |
| 4,215,570 A | 8/1980 | Eer Nisse | |
| 4,309,908 A | 1/1982 | Rapp et al. | |
| 4,321,500 A | 3/1982 | Paros et al. | |
| 4,372,173 A | 2/1983 | Eer Nisse et al. | |
| 4,382,385 A | 5/1983 | Paros | |
| 4,384,495 A | 5/1983 | Paros | |
| 4,406,966 A | 9/1983 | Paros | |
| 4,455,874 A | 6/1984 | Paros | |
| 4,683,757 A * | 8/1987 | Adams et al. ............... 73/756 |
| 6,497,152 B2 | 12/2002 | Paros et al. | |
| 6,595,054 B2 | 7/2003 | Paros et al. | |
| 6,813,960 B1 * | 11/2004 | Owen et al. ............... 73/808 |
| 7,024,934 B2 * | 4/2006 | Yu ............... 73/514.37 |
| 7,296,473 B2 | 11/2007 | Ishii | |
| 7,325,460 B2 * | 2/2008 | Ariav et al. ............... 73/820 |
| 7,467,553 B2 * | 12/2008 | Meyer ............... 73/514.29 |

FOREIGN PATENT DOCUMENTS

| | | |
|---|---|---|
| JP | 56-119519 | 9/1981 |
| JP | 64-009331 | 1/1989 |
| JP | 64-086608 | 3/1989 |
| JP | 02-228534 | 9/1990 |
| JP | 2-228534 | 9/1990 |
| JP | 07-019981 | 1/1995 |
| JP | 2004-347387 | 12/2004 |
| JP | 2005-017050 | 1/2005 |
| JP | 2005-121628 | 5/2005 |
| JP | 2006-194736 | 7/2006 |
| JP | 2007-057395 | 3/2007 |
| JP | 2007-132697 | 5/2007 |
| JP | 2008-232886 | 10/2008 |

* cited by examiner

*Primary Examiner* — Andre J Allen
(74) *Attorney, Agent, or Firm* — Harness, Dickey & Pierce, P.L.C.

(57) ABSTRACT

A pressure sensor includes: a housing; an attachment portion coupled to the housing and having a pressure input orifice; a diaphragm sealing the pressure input orifice of the attachment portion and having a first surface that is a pressure receiving surface; and a pressure sensitive unit having a detecting axis in a direction in which a force is detected. In the sensor, an end of the pressure sensitive unit is connected to a central area of a second surface of the diaphragm, another end of the pressure sensitive unit is connected to the housing, and the detecting axis is approximately orthogonal to the pressure receiving surface.

14 Claims, 7 Drawing Sheets

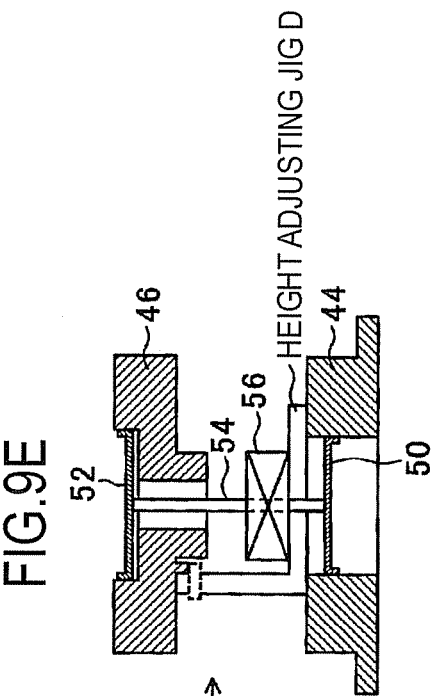
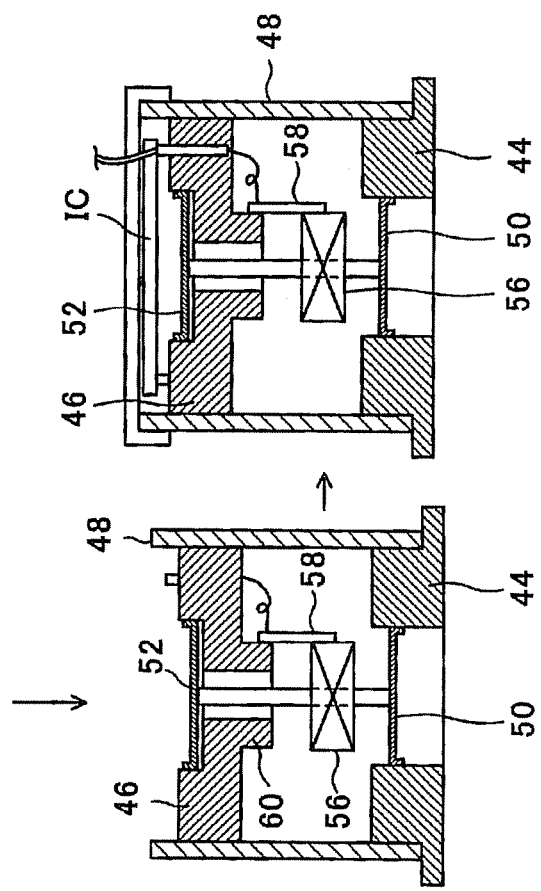

PRESSURE SENSOR

BACKGROUND

1. Technical Field

The present invention relates to a pressure sensor that does not use oil as a pressure receiving medium and therefore is suitable for broadening a scope of application thereof.

2. Related Art

Pressure sensors that use a piezoelectric resonator as a pressure sensitive element are known as a water pressure gauge, an air gauge, and a differential pressure gauge. The piezoelectric resonator includes, for instance, an electrode pattern on a planar piezoelectric substrate, and a direction in which a force is detected set to be a detecting axis. When pressure is applied in the direction of the detecting axis, a resonance frequency of the piezoelectric resonator changes and the pressure is detected by using the fluctuation in the resonance frequency. JP-A-56-119519, JP-A-64-9331, and JP-A-2-228534, as a first, second, and third examples, disclose a pressure sensor including a piezoelectric resonator as a pressure sensitive element. When a pressure is applied to bellows from a pressure input orifice, a force F corresponding to an effective area of the bellows is transmitted to the piezoelectric resonator as a compressive force or a tensile force through a force transmitting unit that has a pivot as a fulcrum (a flexible hinge). A stress corresponding to the force F appears in the piezoelectric resonator and this stress changes the resonance frequency. The pressure sensor measures pressure by detecting a change in the resonance frequency appearing in the piezoelectric resonator.

A pressure sensor in related art will be described with reference the first example and the like. FIG. 11 is a schematic view showing a structure of a pressure sensor in related art.

A pressure sensor 101 according to related art shown in FIG. 11 includes a case 104 having first and second pressure input orifices 102 and 103 that are arranged to face each other, and a force transmitting member 105 disposed inside the case 104. A first end of the force transmitting member 105 is sandwiched with and coupled to one end of a first bellows 106 and one end of a second bellows 107. The other end of the first bellows 106 is coupled to the first pressure input orifice 102, and the other end of the second bellows 107 is coupled to the second pressure input orifice 103. Moreover, a double-ended tuning fork resonator 109 serving as a pressure sensitive element is disposed between a second end of the force transmitting member 105 and an end portion of a substrate 108 which is an opposite end from a pivot (fulcrum).

Here, the bellows of this pressure sensor is filled with a liquid so as to detect pressure with high precision. Generally, oils such as silicon oil which has high viscosity are commonly used as the liquid, in order to prevent bubbles from entering and accumulating inside the bellows or between the folds of the bellows.

Thus, the interior of the first bellows 106 is filled with oil 110 having viscosity. In a case where an object for a pressure measurement is a liquid, the oil 110 faces to be brought into contact with the liquid at an opening 111 opened at the first pressure input orifice 102. Here, a size of the opening 111 is set such that the oil 110 does not leak out.

In the pressure sensor 101 having such structure, when the pressure F is applied to the oil 110, which fills the first bellows 106, from the liquid that is an object for pressure measurement, this pressure F is then applied to the first end of the force transmitting member 105 (a pivotably supported swing arm) through the first bellows 106. At the same time, atmospheric pressure is applied to the second bellows 107 and a force equivalent to the atmospheric pressure is applied to the first end of the force transmitting member 105.

Consequently, a force equivalent to a differential pressure is applied through the second end of the force transmitting member 105 to the double-ended tuning fork resonator 109 as a compressive force or a tensile force with a pivot of the substrate 108 as a pivoting point. The differential pressure means a pressure difference between the atmospheric pressure and the pressure F applied by the liquid that is the object for pressure measurement. Due to the compressive force or the tensile force applied to the double-ended tuning fork resonator 109, a stress is generated in the resonator 109. In accordance with a strength of the stress, the resonance frequency of the resonator 109 changes. Therefore, measurement of the resonance frequency enables detection of the strength of the pressure F.

JP-A-2005-121628, as a fourth example, discloses a sensor having such structure that does not include an expensive force transmitting unit (cantilever), which is used in the pressure sensor of the above examples, having a swing arm using a pivot (the flexible hinge) as a fulcrum. In the sensor, two bellows are directly aligned in a sensor housing in a manner sandwiching a pedestal therebetween. The sensor detects a pressure fluctuation generated by a behavior of the pedestal attributing to the difference between pressures lead into each of the bellows. Therefore, a resonator bonding pedestal is sandwiched between one end of the first bellows and one end of the second bellows. A pressure sensitive element is provided at a circumference side of the second bellows and ends of the pressure sensitive element are fixed on the pedestal and on a housing wall positioned at the other end side of the second bellows. Further, a reinforcing board is disposed at an axisymmetrical position to the pressure sensitive element with the second bellows interposed. The ends of the reinforcing board are fixed at the pedestal and at the housing wall.

JP-A-2007-57395 as a fifth example discloses a pressure sensor including a reinforcing flexible member (that is, a string) that connects a pedestal and a housing and are disposed in a direction orthogonal to a direction of a pressure detecting axis. The reinforcing flexible member is provided so as to solve such problem that the sensor disclosed in the fourth example has insufficient strength with respect to a shock coming from a direction orthogonal to a direction of a pressure detecting axis of the bellows.

JP-A-2006-194736 and JP-A-2007-132697 as sixth and seventh examples disclose a pressure sensor that is used in a fixed manner to an engine block so as to detect hydraulic pressure inside an engine. This pressure sensor includes: a sensing unit that outputs an electric signal corresponding to an applied pressure; a pressure-receiving diaphragm unit that receives pressure; and a pressure transmitting member for transmitting the pressure from the diaphragm unit to the sensing unit. Specifically, a first diaphragm for receiving pressure and a second diaphragm for detection are respectively installed on each end surface of a hollow metal stem. The pressure transmitting member is provided between the first diaphragm and the second diaphragm in the stem. The pressure transmitting member is a shaft made of metal or ceramic, and is provided between the pair of diaphragms in a prestressed state. Further, a chip with a strain gauge functionality is installed to an outer end surface of the second diaphragm as a pressure detection element. The pressure transmitting member transmits pressure received by the first diaphragm to the second diaphragm, and deformation of the second diaphragm is converted into an electronic signal by the strain gauge chip, thereby detecting the hydraulic pressure of the engine.

In the first to third examples, the first bellows 106 is filled with the oil 110 as the pressure sensor shown in FIG. 11. The oil 110 has a high thermal expansion coefficient compared to other elements that constitute the pressure sensor 101, such as the force transmitting member 105 and the double-ended tuning fork resonator 109. Therefore, thermal distortion occurs in the components constituting the pressure sensor due to a temperature change. Such thermal distortion works on the double-ended tuning fork resonator 109 as unwanted stress, resulting in an error of a measured pressure value. Thus, the characteristics of the pressure sensor are degraded.

Moreover, since the oil 110 filling the first bellows 106 contacts and faces a liquid that is an object for pressure measurement, the oil 110 may flow into the liquid, or, the liquid may flow into the first bellows 106 depending on how the pressure sensor is installed. This may generate bubbles inside the oil 110 filling the first bellows 106. If bubbles are generated in the oil 110 that serves as a pressure transmitting medium, a force cannot be stably transmitted through the force transmitting member 105 to the double-ended tuning fork resonator 109, thereby possibly inducing an error in a measured pressure value.

Further, as described above, since the oil 110 contacts and faces the liquid that is an object for pressure measurement, the oil 110 may flow into the liquid depending on how the pressure sensor is installed. Therefore, the pressure sensor using the oil 110 according to related art is not applicable to measurement of pressure of a pure liquid that dislikes foreign substances.

Furthermore, the pressure sensor 101 of related art includes the force transmitting member 105 having a complicated structure, thereby being difficult to be miniaturized. In addition, the force transmitting member 105 requires a flexible hinge having a slim constriction so as to be an expensive component, thereby disadvantageously increasing a cost for manufacturing a pressure sensor.

When the pressure sensor of the fourth and fifth examples inclines, the bellows thereof droops. Therefore, a force applied to the pressure sensitive element (the double-ended tuning fork resonator) varies, resulting in a change of a resonance frequency.

Further, the pressure sensor of the fourth and fifth examples has such structure that one end of a pipe filled with an oil is connected to a pressure introduction orifice of the pressure sensor and the other end of the pipe is brought into contact with a liquid that is a measurement object. Therefore, as is the case with the first to third examples, the oil filling the bellows or the pipe contacts and faces the liquid that is the object for the pressure measurement. Accordingly, the oil may flow into the liquid that is the pressure measurement object depending on how the pressure sensor is installed, or bubbles may be generated in the oil filling the bellows. If bubbles are generated in the oil, the oil can not stably transmit a force through the pedestal to the double-ended tuning fork resonator, resulting in an error of the pressure measurement.

The pressure sensor of the fifth example has such structure that the pedestal sandwiched by the bellows is supported by the reinforcing flexible member that is a plate string provided at the lateral surface of the housing. Therefore, a force suppressing a behavior, corresponding to a move of the bellows in the axis direction, of the pedestal acting in the sensor. Therefore, pressure detection sensitivity may be deteriorated. If the reinforcing flexible member is hardened for its firm support, the move of the bellows is suppressed, deteriorating the pressure detecting sensitivity.

Further, in the fourth and fifth examples, the reinforcing board is disposed at an axisymmetrical position to the pressure sensitive element with the bellows interposed. Therefore, a move is the bellows is suppressed, deteriorating the pressure detecting sensitivity.

In the sixth and seventh examples, the diaphragm and the shaft are in contact with each other in the prestressed state. The pressure sensor is used at a high temperature in a high pressure. Therefore, if the diaphragm and the shaft were rigidly fixed, the mechanism may be damaged by the difference between thermal expansions of the components. In consideration of the thermal expansions, the diaphragm and the shaft only have a point contact, and are not bonded by bonding means such as adhesives. Therefore, there is a very high possibility that this point contact deviates when the diaphragm and the shaft operate by the pressure change. As the point contact deviates, a force working in both of the diaphragm and the shaft leaks out, resulting in pressure detection with poor precision. Moreover, the pressure sensor of the sixth and seventh examples is used at a high temperature in a high pressure. Therefore, it is desirable that the force transmitting member be as long as possible in order to create a distance between the pressure receiving unit and the sensing unit and avoid thermal effect on the components such as the chip of the sensing unit. Thus the sensor of the examples is not suitable for miniaturization. In addition, in the case of the sixth and seventh examples, a force is transmitted with a shaft disposed between a pair of diaphragms. However, since a sensor chip is attached to the diaphragm on the sensing unit, the property of the diaphragms differs between the pressure receiving side and the sensing unit side. Therefore, the measurement accuracy can not be improved.

SUMMARY

An advantage of the present invention is to provide a pressure sensor that does not use oil as a pressure receiving medium thereinside, is miniaturized with a force transmitting member of which a structure is simplified, and has high measurement accuracy of pressure detection.

The invention can be achieved by following aspects.

A pressure sensor according to a first aspect of the invention includes: a housing; an attachment portion coupled to the housing and having a pressure input orifice; a diaphragm sealing the pressure input orifice of the attachment portion and having a first surface that is a pressure receiving surface; and a pressure sensitive unit having a detecting axis in a direction in which a force is detected. In the sensor, an end of the pressure sensitive unit is connected to a central area of a second surface of the diaphragm, another end of the pressure sensitive unit is connected to the housing, and the detecting axis is approximately orthogonal to the pressure receiving surface.

According to the first aspect, the diaphragm is formed as a pressure receiving medium that receives pressure of an environment which is an object for pressure measurement, so that the pressure sensor requires no oil as a pressure receiving medium. Thus, no oil flows toward the environment which is the object for the pressure measurement. Therefore, the sensor is applicable for measuring pressure of a pure liquid, which dislikes foreign substances, as an environment which is an object for pressure measurement.

Further, the pressure sensor requires no oil that has a large thermal expansion coefficient, largely improving its temperature characteristics.

In the pressure sensor according to the first aspect, the pressure sensitive unit may be composed of a force transmitting unit of which one end contacts with the central area of the second surface of the diaphragm, a movable unit fixed on the force transmitting unit, and a pressure sensitive element of which a first end portion is connected to the movable unit and a second end portion is connected to the housing.

According to the first aspect, since the pressure sensor does not require a force transmitting member that is expensive and complex, the pressure sensor can be miniaturized and a cost thereof can be decreased.

In the pressure sensor according to the first aspect, the force transmitting unit may be a shaft.

According to the aspect, the pressure sensitive element can be prevented from having unwanted distortion.

In the pressure sensor according to the first aspect, the pressure sensitive element may include base portions on both end portions thereof, and a vibrating portion between the base portions provided on the both end portions.

According to the aspect, the pressure sensor is easily realized by using a double-ended tuning fork resonator, a thickness shear resonator, or a surface acoustic wave resonator of which a resonance frequency varies depending on extensional and compressive stress generated in the pressure sensitive element. Especially, the double-ended tuning fork resonator has excellent sensitivity with respect to extensional and compressive stress so as to have excellent detecting accuracy. Therefore, by using the double-ended tuning fork resonator, the pressure sensor that detects a slight pressure difference can be realized.

In the pressure sensor according to the first aspect, a material of the diaphragm may be one of metal, ceramic, and piezoelectric crystal.

According to the aspect, a corrosion resistant material such as a metal like stainless, and ceramic, or single crystalline body of quartz is selectively used as a material of the diaphragm depending on a material of a measurement object. Accordingly, a pressure sensor with high measurement accuracy and stability can be achieved.

In the pressure sensor according to the first aspect, a material of the shaft may be one of stainless, aluminum, and ceramic.

According to the aspect, stainless or aluminum that is a highly-rigid and stable material, or ceramic that is easily processed is selectively used depending on a used of a pressure sensor, being able to achieve a pressure sensor having high accuracy and stability.

In the pressure sensor according to the first aspect, a material of the housing may be one of stainless, aluminum, and ceramic.

According to the aspect, distortion, caused by heat, of the pressure sensitive element can be suppressed.

A pressure sensor according to a second aspect includes: a housing having a pressure input orifice; a diaphragm sealing the pressure input orifice of the housing and having an outer surface that is a pressure receiving surface; and a pressure sensitive unit of which an end is connected to a central area of an inner surface of the diaphragm, another end is connected to the housing, and a detecting axis is set along an axis orthogonal to the pressure receiving surface of the diaphragm, in the housing.

According to the second aspect, the pressure sensor does not employ oil but employs the diaphragm as a pressure receiving medium that receives pressure of an environment which is an object for pressure measurement, being applicable for measuring pressure of a pure liquid that dislikes foreign substances. Further, the pressure sensor does not employ oil having high thermal expansion coefficient, being able to largely improve its temperature characteristics. In addition, the pressure sensor includes the pressure sensitive unit in the housing so as to be miniaturized.

In the pressure sensor according to the second aspect, the pressure sensitive unit may be composed of a force transmitting unit connected orthogonal to the diaphragm and a pressure sensitive element of which one end is connected to the force transmitting unit and the other end is connected to a wall surface of the housing.

According to the first aspect, since the pressure sensor does not require a force transmitting member that has a pivot structure, the structure thereof is simplified. Therefore, the pressure sensor can be miniaturized and a cost thereof can be reduced.

A pressure sensor according to a third aspect includes: a housing; a pressure input orifice coaxially formed on one of opposed wall surfaces of the housing; a diaphragm sealing the pressure input orifice and having an outer surface that is a pressure receiving surface; a force transmitting unit connected to a central area of an inner surface of the diaphragm in the housing; and a pressure sensitive element of which one end is connected to the force transmitting unit, the other end is connected to the housing, and a detecting axis is set along an axis orthogonal to the pressure receiving surface of the diaphragm, in the housing.

According to the structure, a pressure sensor using no oil and miniaturized is achieved as an absolute pressure sensor.

A pressure sensor according to a fourth aspect includes: a housing; a pair of pressure input orifices coaxially formed on opposed wall surfaces of the housing; first and second diaphragms respectively sealing the pressure input orifices and having an outer surface that is a pressure receiving surface; a force transmitting unit coupling central areas of inner surfaces of the first and second diaphragms in the housing; and a pressure sensitive element of which one end is connected to an intermediate portion of the force transmitting unit, the other end is connected to the housing, and a detecting axis is set parallel to an axis orthogonal to the pressure receiving surface of the diaphragm.

According to the structure, a pressure sensor using no oil and miniaturized is achieved as a relative pressure sensor.

In the pressure sensor according to the second aspect, a guide shaft may be provided inside the housing in parallel with the detecting axis.

According to the second to fourth aspects, only a force in the detecting axis direction acts on the pressure sensitive element, being able to improve the detecting accuracy of the pressure sensor.

In the pressure sensor according to the third aspect, the force transmitting unit may be a shaft, and the pressure sensitive element may be disposed in parallel with the shaft.

According the structure, the height of the housing can be shortened, being able to advance the miniaturization of the pressure sensor.

In the pressure sensor according to the third aspect, the force transmitting unit may be a shaft, and the pressure sensitive element may be disposed coaxially with the shaft.

According to the structure, the pressure sensor for measuring absolute pressure has a simplified structure, being able to reduce a cost.

A pressure sensor according to a fifth aspect includes: a housing composed of first and second cases that are end plates and opposed to each other and a third case surrounding the first and second cases and forming a lateral surface member; first and second diaphragms respectively sealing pressure input orifices opened in the first and second cases; a center shaft coupling the first and second diaphragms on central areas of the diaphragms and integrated with the diaphragms so as to enable a force transmission, inside the housing; a pressure sensitive element of which both end portions are attached to a movable pedestal fixed on the center shaft and a fixing pedestal provided to an inner surface portion of the housing, and a detecting axis is set in parallel with the center shaft; and a plurality of supporting poles disposed peripherally to the center shaft and coupling the first and second cases.

According to the fifth aspect, pressure can be transmitted without using oil, and, due to the plurality of supporting poles, pressure can be measured with high accuracy without depending on an installed posture of the housing. A case having a flange and constituting the housing is used as an attachment pedestal to a container of an object liquid for measurement, generating no unwanted stress to the pressure sensitive unit such as the center shaft in the attachment operation.

A pressure sensor according to a sixth aspect includes: a housing composed of first and second cases that are end plates and opposed to each other, and a third case surrounding the first and second cases and forming a lateral surface member; a first diaphragm sealing a pressure input orifice opened in the first case; a center shaft connected to a central area of the first diaphragm and integrated with the first diaphragm so as to enable a force transmission, inside the housing; a pressure sensitive element of which both end portions are attached to a movable pedestal fixed on an end portion of the center shaft and a fixing pedestal provided to an inner surface portion of the second case, and a detecting axis is set coaxially with the center shaft; and a plurality of supporting poles disposed peripherally to the center shaft and coupling the first and second cases.

According to the structure, the pressure sensor uses no oil so as to be a pressure sensor for measuring an absolute pressure having a simple structure and therefore requiring reduced cost.

In the pressure sensor according to the fifth aspect, the center shaft and the movable pedestal may be cut out and processed from one material member.

Accordingly, the pedestal is prevented from moving or deviating from the fixing portion of the center shaft.

In the pressure sensor according to the fifth aspect, the center shaft and the diaphragm may be bonded and integrated at a joining part by an adhesive.

According to the structure, the diaphragm and the center shaft are prevented from being displaced, preventing degradation of the measurement accuracy.

BRIEF DESCRIPTION OF THE DRAWINGS

The invention will be described with reference to the accompanying drawings, wherein like numbers reference like elements.

FIGS. 9A to 9G are diagrams showing a process of assembling the pressure sensor.

DESCRIPTION OF EXEMPLARY EMBODIMENTS

Figure 1:
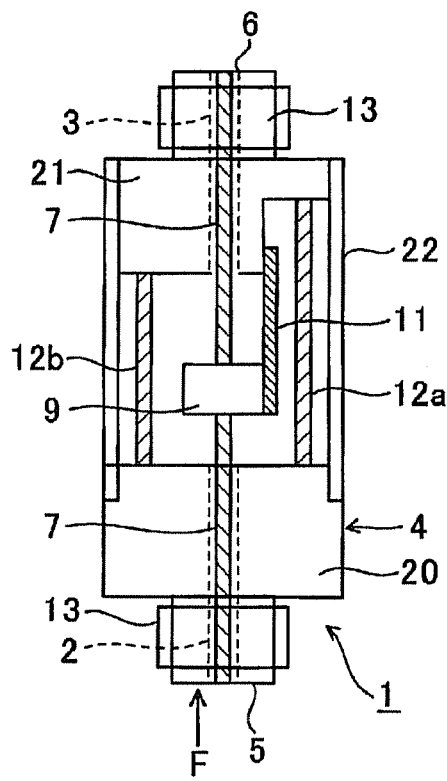
FIG. 1 is a schematic view showing a structure of a pressure sensor according to a first embodiment of the invention.

Hereinafter, the invention will be described in detail based on embodiments shown in the drawings. In each of the embodiments, a case where a measurement object is liquid will be illustrated.

First Embodiment

FIG. 1 is a schematic view showing a structure of a pressure sensor according to a first embodiment of the invention.

This pressure sensor 1 shown in FIG. 1 has a first pressure input orifice 2 and a second pressure input orifice 3 that are used for vacuuming the inside and are disposed to be opposed to each other. Further, the pressure sensor 1 includes a housing 4 for housing components described later. On an end portion of the first pressure input orifice 2, a first diaphragm (a pressure receiving diaphragm) 5 is attached and exposed to outside. The first diaphragm 5 bends depending on a pressure of a liquid that is a measurement object. On an end portion of the second pressure input orifice 3, a second diaphragm (an atmospheric pressure setting diaphragm) 6 is attached. The second diaphragm 6 bends depending on atmospheric pressure. Between the first diaphragm 5 and the second diaphragm 6, a center shaft 7 is disposed as a force transmitting unit and is exposed to outside. To a predetermined position of the shaft 7, a movable member 9 is attached. A pressure sensitive element 11 is fixed by connecting and supporting support portions of its both ends, which are positioned in a force detecting direction, to the movable member 9 and a fixing portion 10 of a second case 21. The pressure sensitive element 11 is disposed such that its displacement direction is parallel to a displacement direction of the shaft 7 connecting pressure receiving portions of the first diaphragm 5 and the second diaphragm 6, that is, parallel to the force detecting direction. Between the first case 20 and the second case 21, supporting poles 12a and 12b are disposed. Dowel holes (not shown) having shapes corresponding to outer shapes of the supporting poles 12a and 12b are formed on inner surfaces of the first case 20 and the second case 21. The supporting poles 12a and 12b serving as guide shafts are inserted in the dowel holes to be adhered. The supporting poles 12a and 12b function to prevent unnecessary deformation of the pressure sensitive element in assembling and in using of a product. In the drawing, two supporting poles are formed, but one supporting pole or three or more of supporting poles may be formed.

The first embodiment will be more specifically described with reference to FIGS. 1 and 2. The pressure sensor 1 includes the housing 4 that is a hollow cylindrical chassis. The housing 4 is composed of three blocks of the first case (a lower end plate) 20, the second case (an upper end plate) 21, and a third case 22 that is a cylindrical sidewall, and its inside is hollowed. On outer end surfaces of the first and second cases 20 and 21, pipe sleeves respectively serving as first and second attaching portions are formed in a protruding manner along an axis core of the housing 4. On the pipe sleeves, outer screws are formed on their peripheral surfaces so as to be attachment clamps 13 serving as connecting portions used for introducing an object liquid for a measurement and introducing atmosphere. The first and second pressure input orifices 2 and 3 communicating with an internal space are formed so as to penetrate through the first and second cases 20 and 21 and the attachment clamps 13 along the same axis core as the axis core of the housing and be opened at end surfaces of the attachment clamps 13. The diaphragm is attached to an outer end surface of each of the attachment clamps 13. The diaphragm seals each of the pressure input orifices 2 and 3 so as to segregate the inside from the outside. In the embodiment, the first diaphragm 5 for receiving pressure is attached at a first case 20 side, and the second diaphragm 6 for setting atmospheric pressure is attached at a second diaphragm 6 side. These diaphragms 5 and 6 have the same structure, and are set such that their bending amounts are same as each other when they receive the same pressure. Needless to say, the inside of the housing 4 is segregated from the outside by the diaphragms 5 and 6 and the internal space can be maintained to be vacuumed by an air vent unit which is not shown.

In such a housing structure, a pressure sensitive unit having a detecting axis along the force detecting direction is provided, in the inside of the housing 4. An end of the pressure sensitive unit is coupled to a central area of an inner surface of the diaphragm, and another end of the pressure sensitive unit is coupled to the housing. The detecting axis is approximately orthogonal to the pressure receiving surface. That is, the center shaft 7 constituting a part of the pressure sensitive unit is disposed along the axis core of the housing 4 so as to penetrate the first and second pressure input orifices 2 and 3. The end portions of the shaft 7 are fixed on the central area of the diaphragms 5 and 6 by an adhesive. Thus, bending deformation of the diaphragms 5 and 6 can be transmitted to each other. Namely, the center shaft 7 serves as a force transmitting member. The center shaft 7 is made of a rigid material that does not generate deformation such as buckling. Namely, the center shaft 7 may be made of a metal such as stainless and aluminum, or ceramic. In order to lighten the center shaft 7, the shaft 7 may be composed of a pipe, for example. On the intermediate part of the center shaft 7, a small block that is an attachment pedestal of the pressure sensitive element described later is formed in a unified manner or attached afterward. The small block is the movable member 9 that follows movement, in the axis direction, of the center shaft 7. The center shaft 7 and the movable member 9 may be a unified body that is obtained by cutting and processing one material member. Accordingly, the movable member 9 does not move or deviate from a fixing portion of the center shaft 7, improving detecting accuracy.

To the center shaft 7, the pressure sensitive element 11 composing a major body of the pressure sensitive unit is communicated. In the embodiment, the pressure sensitive element 11 is a double-ended turning fork resonator. An attachment supporting portion at one end side of the element is fixed on the movable member 9, while an attachment supporting portion at the other end side of the element is fixed on the fixing portion 10 of the second case 21 described above. Here, the pressure sensitive element 11 is disposed so as to make the detecting axis parallel to the center shaft 7. In the structure, an axis direction shift of the center shaft 7, that is, a force is transmitted through the movable member 9 to the pressure sensitive element 11 as a shift along the detecting axis of the pressure sensitive element 11. The shift of the center shaft 7 is orthogonal to the pressure receiving surface of the first diaphragm 5 for receiving pressure. Here, a recessed portion is formed on the second case 21 so as to position a lateral surface thereof on the same level as a lateral surface of the movable member 9. On the lateral surfaces, the pressure sensitive element 11 is attached in parallel to the center shaft 7. In addition, the height of the housing is shortened with this structure.

Inside the housing 4, the supporting poles 12a and 12b that are a plurality of guide shafts are disposed in parallel with the center shaft 7 in a manner interposing the center shaft 7 therebetween. The poles 12a and 12b keep an interval between the first case 20 and the second case 21 constant, and prevent degradation of detecting accuracy caused by deformation of the housing 4 by external force or arbitrary posture. Therefore, the end portions of the supporting poles 12a and 12b are pressed into the dowel holes formed in the first and second cases 20 and 21 and firmly fixed.

The pressure sensor 1 structured as above is attached to a housing container for a liquid that is a measurement object with the attachment clamps 13 and 13 shown in FIG. 1, for example, that have a spiral guide on their circumference so as to function as screws. Thus, the first diaphragm 5 is directly brought into contact with the liquid that is the measurement object. The attachment clamps 13 and 13 need to have a predetermined shape and thickness depending on the strength of pressure of a liquid that is a measurement object and a structure of a housing container for the liquid.

The first diaphragm 5 is an elastic pressure receiving element. The diaphragm 5 bends toward the center shaft 7 when receiving pressure from the liquid with which the diaphragm 5 contacts Thus, force F is applied to the movable member 9 through the center shaft 7 in an up and down direction of FIG. 1. On the other hand, the second diaphragm 6 receives an atmospheric pressure. Thus force F2 is applied to the movable member 9 through the center shaft 7 the second diaphragm 6 from that has received the atmospheric pressure.

In this case, force (F1−F2) corresponding to a difference between the force F1, which is generated by the liquid and applied to the first diaphragm 5, and the force F2, which is generated by the atmospheric pressure and applied to the second diaphragm 6, is applied to first surfaces (surfaces parallel to the pressure receiving surface of the diaphragm) of the movable member 9. Therefore, a compressive force or a tensile force is applied to the pressure sensitive element 11 that is disposed between a second surface (a surface orthogonal (intersecting) to the pressure receiving surface of the diaphragm) of the movable member 9 and the fixing portion 10 of the second case 21. The compressive force or the tensile force applied to the pressure sensitive element 11 generates an extensional (tensile) stress or a compressive stress in the pressure sensitive element 11, changing a resonance frequency in accordance with strength of the stress. Therefore, a relative pressure value to be obtained by using the atmospheric pressure as a reference of zero can be obtained by measuring the resonance frequency with a microcomputer, for example.

In assembling the pressure sensor 1, it is required to prevent an occurrence of distortion caused by an unnecessary stress in the pressure sensitive element 11. Therefore, in the embodiment, the diaphragms, the shaft, and the movable member can be accurately assembled with the two supporting poles 12a and 12b.

An assembling method of the pressure sensor 1 will now be described.

Figure 2:
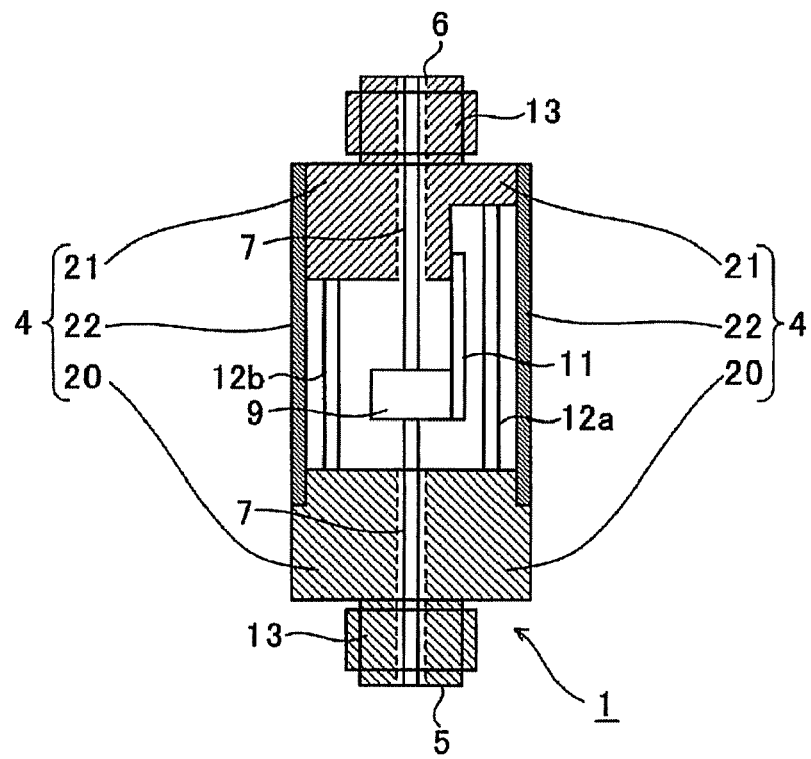
FIG. 2 is a schematic view showing a structure of a housing 4 of a pressure sensor 1.

FIG. 2 is a schematic view showing a structure of the housing 4 of the pressure sensor 1.

The housing 4 is composed of three blocks; the first case 20 provided with the first diaphragm 5 that is a pressure receiving medium with respect to a liquid that is a measurement object, the second case 21 provided with the second diaphragm 6 that is a pressure receiving medium with respect to atmospheric pressure, and the third case 22 for airtightly sealing the pressure sensor 1. In addition, the first case 20 and the second case 21 are assembled together with the supporting poles 12a and 12b, improving assembling accuracy.

An assembling procedure of the pressure sensor 1 will now be described.

Figure 3:
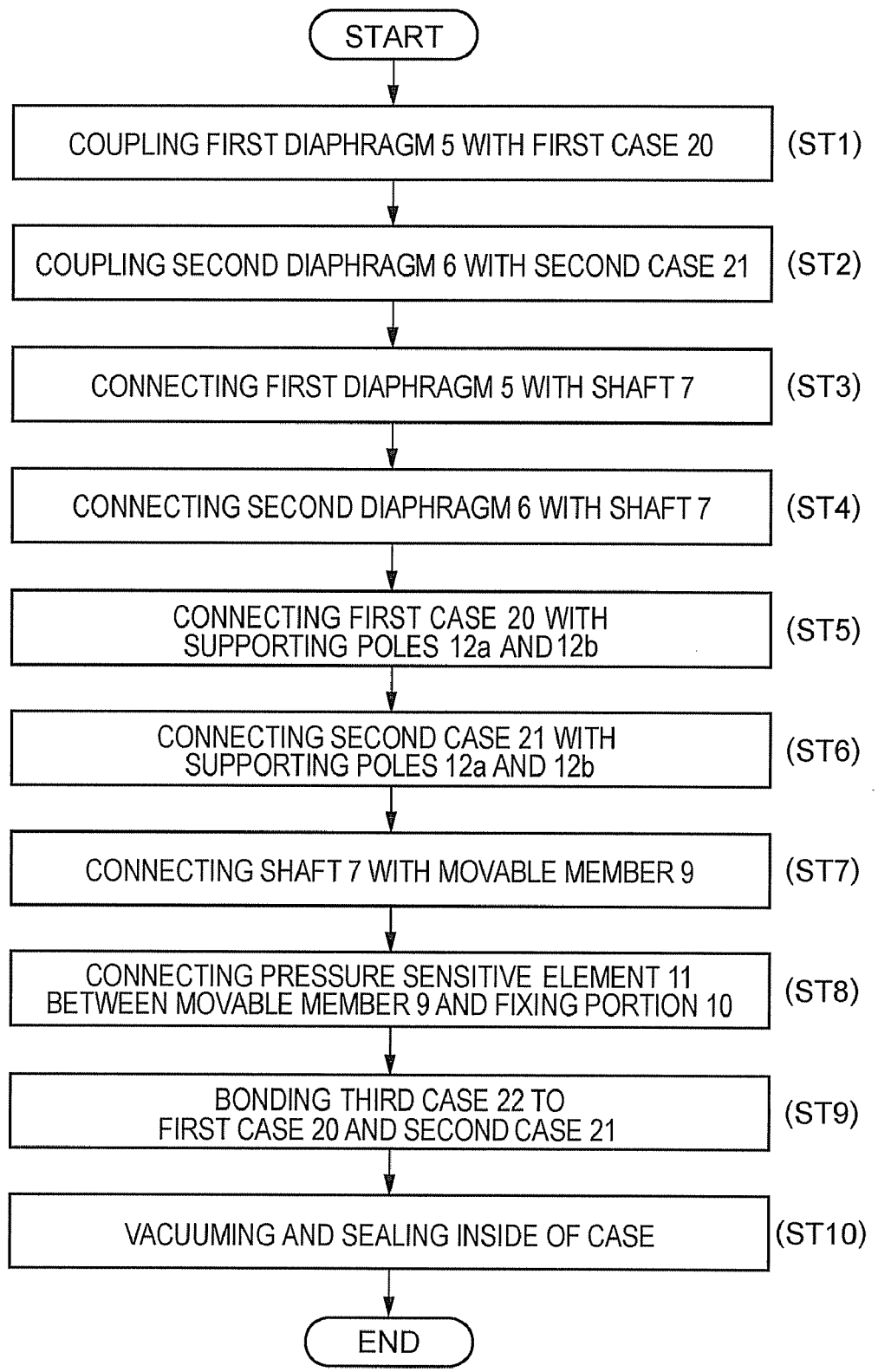
FIG. 3 is a flow chart showing a procedure of assembling the pressure sensor according to the invention.

FIG. 3 is a flow chart showing a procedure of assembling the pressure sensor according to the embodiment of the invention.

In the procedure, the first diaphragm 5 is first connected with an end portion of the first pressure input orifice 2 provided to the first case 20 (ST1). Next, the second diaphragm 6 is connected with an end portion of the second pressure input orifice 3 provided to the second case 21 (ST2). Then, one end of the shaft 7 is accurately connected with the first diaphragm 5 in an orthogonal manner with an assembling jig which is described later (ST3). Further, the other end of the shaft 7 is accurately connected with the second diaphragm 6 in an orthogonal manner with an assembling jig which is described later (ST4). Next, the first case 20 and the supporting poles 12a and 12b are connected by inserting the supporting poles 12a and 12b to the dowel holes of the first case 20 to which the first diaphragm 5 and the one end of the shaft 7 are coupled (ST5), and the second case 21 and the supporting poles 12a and 12b are connected by inserting the supporting poles 12a and 12b to the dowel holes of the second case 21 to which the second diaphragm 6 and the other end of the shaft 7 are coupled (ST6). Then, the movable member 9 is connected at a predetermined position of the shaft 7 (ST7), and the pressure sensitive element 11 is connected between the movable member 9 and the fixing portion 10 so as to set the displacement direction thereof to be in the same displacement directions of the first diaphragm 5 and the second diaphragm 6 (ST8). Finally, the third case 22 for sealing the inside of the case is bonded to the first case 20 and the second case 21 that are provided with respective components (ST9), and the inside of the case is vacuumed and sealed (ST10). Consequently, the pressure sensor 1 is completed.

Here, the shaft 7 to be connected with each of the first diaphragm 5 and the second diaphragm 6 in the orthogonal direction is required to be connected in a manner keeping its orthogonality with high accuracy so as to improve measuring accuracy of the pressure sensor. In the embodiment therefore, the shaft is attached by a positioning assembling method as shown in FIG. 4.

Figure 4:
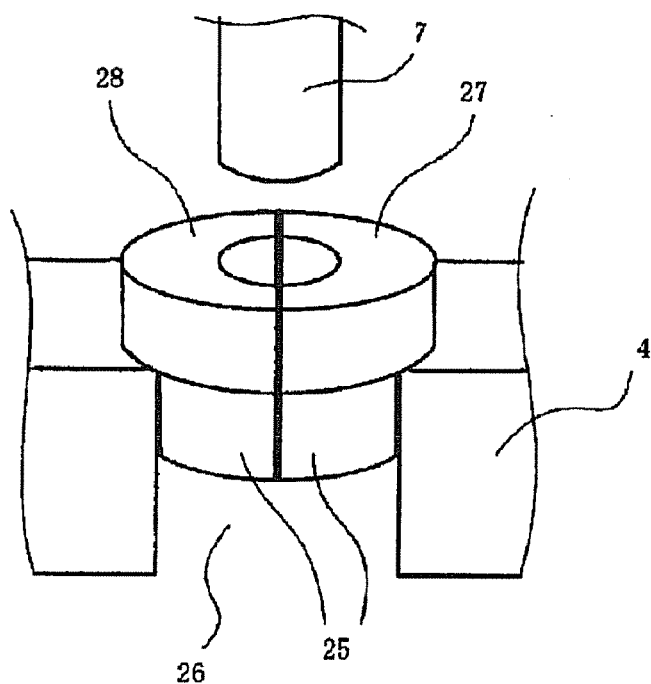
FIG. 4 is a diagram showing an assembling method using a positioning jig.

FIG. 4 is a diagram showing an assembling method using a positioning jig.

A positioning jig 25 can be divided into two semicircular blocks which together form a shape of a slotted cylinder. The positioning jig 25 can be closely inserted to a hole 26 that communicates with the first pressure input orifice 2 provided to the housing 4. After the positioning jig 25 is arranged in the hole 26, the shaft 7 is inserted to the center of the positioning jig 25. Then, after the shaft 7 that is inserted and the first diaphragm 5 (not shown) are connected, a first block 27 and a second block 28 of the positioning jig 25 are separated and removed. Consequently, the shaft 7 is precisely connected to the first diaphragm 5 in the orthogonal direction, being able to improve the measuring accuracy of the pressure sensor. The second diaphragm 6 and the shaft 7 need to be connected with each other with the positioning jig 25 in the similar way.

The pressure sensitive element 11 of the embodiment is made of a piezoelectric material such as quartz crystal, lithium niobate, and lithium tantalite, and is formed as an element such as a double-ended tuning fork resonator element, a surface acoustic wave resonator, and a thickness shear resonator. The pressure sensitive element 11 is supported by connecting its both end portions with the movable member 9 and the fixing portion 10 of the fixing member. Here, the pressure sensitive element 11 has a detecting axis in the direction in which a force is detected. A line joining both end portions of the pressure sensitive element 11 is parallel to the detecting axis. The pressure sensitive element 11 is electrically coupled with an oscillation circuit (not shown) attached to the housing 4, and oscillates with a specific resonance frequency by an alternating voltage supplied from the oscillation circuit. The tensile (stretching) force or the compressive force from the movable member 9 applied to the pressure sensitive element 11 generates a tensile (stretching) stress or a compressive stress inside the element 11, changing the resonance frequency. Especially, the double-ended tuning fork resonator is suitable for a pressure sensor having excellent detecting accuracy such as an ability of detecting a slight pressure difference. Specifically, resonance frequency of the double-ended tuning fork resonator changes substantially largely with respect to the tensile and compressive stress and therefore the variable width of the resonance frequency is large, compared to resonators such as a thickness shear resonator. In the double-ended tuning fork resonator, the tensile stress decreases amplitude of an oscillating arm (vibration unit), thereby increasing the resonance frequency, while the compressive stress increases amplitude of the oscillating arm, thereby decreasing the resonance frequency. A preferable material for a piezoelectric substrate of the double-ended tuning fork resonator is quartz which has excellent temperature characteristics.

The first diaphragm 5 and the second diaphragm 6 are suitably made of an corrosion resistant material such as a metal like stainless, and ceramic, or may be made of single crystalline body of quartz crystal or other amorphous body. The first diaphragm 5 contacting with a liquid that is a measurement object is preferably made of a material that is not corroded or deteriorated when it is brought into contact with the liquid. The shaft 7, the first diaphragm 5, the second diaphragm 6, and the housing 4 are preferably made of the same material, such as stainless, aluminum, and ceramic, as each other. However, they may be made of different materials from each other.

The inside of the housing 4 is vacuumed in the pressure sensor 1, so that a Q-factor of the pressure sensitive element 11 can be improved and a stable resonance frequency can be ensured. Accordingly, a long term stability of the pressure sensor can be ensured.

A use of same diaphragms as a pressure receiving medium with respect to a liquid that is a measurement object and as a pressure receiving medium with respect to atmospheric pressure can improve suppressing characteristics that is a constant force without any change.

Selecting and using a material having a small temperature expansion coefficient for the housing 4 and the shaft 7 can improve the temperature characteristics of the pressure sensor. Especially, if the shaft 7 is made of ceramic that has a small temperature expansion coefficient, the temperature characteristics of the pressure sensor mostly depends on temperature characteristics of the pressure sensitive element.

As described above, the pressure sensor according to the first embodiment is provided with the diaphragm as a medium that contacts with a liquid which is a measurement object, thereby requiring no oil. Since no oil flows toward the liquid, the pressure sensor is applicable to a measurement of pressure of a pure liquid that dislikes foreign substances. Further, the pressure sensor of the first embodiment converts received pressure into force by the diaphragm so as to transmit the force through the shaft to the pressure sensitive element.

Thus, the pressure sensor does not include a force transmitting unit having an expensive and complicated structure such as a cantilever. Accordingly, the pressure sensor can be miniaturized and the cost can be decreased.

Second Embodiment

A pressure sensor according to a second embodiment of the invention will now be described.

Figure 5:
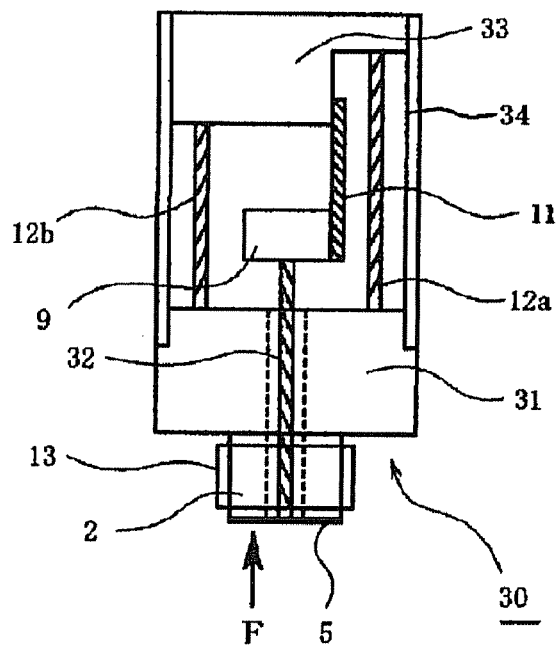
FIG. 5 is a schematic view showing a structure of a pressure sensor according to a second embodiment of the invention.

FIG. 5 is a schematic view showing a structure of a pressure sensor according to the second embodiment of the invention. The identical numerals are given to the same components as those described above with reference to FIG. 1 and those descriptions will be omitted.

In the pressure sensor of the first embodiment, the pressure receiving medium with respect to atmospheric pressure is connected with the movable member 9 so as to measure a relative pressure represented by using the atmospheric pressure as a reference of zero. While, in the pressure sensor of the second embodiment, only a pressure receiving medium with respect to a liquid that is a measurement object is connected with the movable member 9 so as to measure an absolute pressure measured with a vacuum state as a reference of zero and a pressure receiving medium with respect to atmospheric pressure is removed.

In a pressure sensor 30 shown in FIG. 5, only a pressure receiving medium with respect to a liquid that is a measurement object is coupled to the movable member 9, so that a force originating from a force F of the liquid is applied to the movable member 9. Therefore, a force corresponding to a force applied to the first diaphragm 5 is applied to the movable member 9 as a compressive force or a tensile force. In response to the application of the compressive force or the tensile force, an extensional (tensile) stress or a compressive stress is generated in the pressure sensitive element 11, resulting in a change of resonance frequency. Therefore, an absolute pressure value to be obtained with a vacuumed state as a reference of zero can be obtained by measuring the resonance frequency with calculating equipment such as a microcomputer. Accordingly, the pressure sensor of the second embodiment functions as an absolute pressure sensor.

The pressure sensor of the second embodiment is assembled in accordance with the assembling procedure described in the first embodiment. Concretely, a product is completed through the following steps: a step of coupling the first diaphragm 5 with a first case 31; a step of connecting the first diaphragm 5 with a shaft 32; a step of connecting the first case 31 with the supporting poles 12a and 12b; a step of connecting the shaft 32 with the movable member 9; a step of connecting supporting portions at both ends, which are positioned in a direction in which a force is detected, of the pressure sensitive element 11 respectively with the movable member 9 and a fixing portion 35 of a second case 33 so as to connect and support the pressure sensitive element 11; a step of bonding a third case 34 to the first case 31 and the second case 33; and a step of air-tightly sealing the inside of the case. The pressure sensor of the embodiment described above includes the double-ended tuning fork resonator as a pressure sensitive element. However, any pressure sensitive element may be used as long as it is a piezoelectric resonator of which a resonance frequency varies depending on extensional and compressive stress. A surface acoustic wave resonator, a thickness shear resonator, and the like are applicable, for example.

Further, the diaphragm that detects pressure of a liquid that is a measurement object may be coated on its surface so as not to be corroded by the liquid and the like. For example, a diaphragm made of metal may be coated by a nickel compound, and a diaphragm composed of a piezoelectric crystal body made of quartz crystal may be coated by silicon.

Further, it is preferable that the first and second cases are made of a metal such as stainless and aluminum because they are easily processed. Furthermore, the third case made of ceramic less affects the pressure sensitive element by its distortion caused by heat.

As described above, the pressure sensor according to the embodiment has a basic structure including the diaphragm, the pressure sensitive unit, and the housing as components. The pressure sensitive unit shown in FIGS. 1 and 5 is composed of the force transmitting unit, the movable unit, and the pressure sensitive element.

The pressure sensor of the embodiment is used for measuring a pressure of a liquid as a measurement object, but the sensor is applicable for measuring a pressure of vapor and the like.

Third Embodiment

Figure 6:
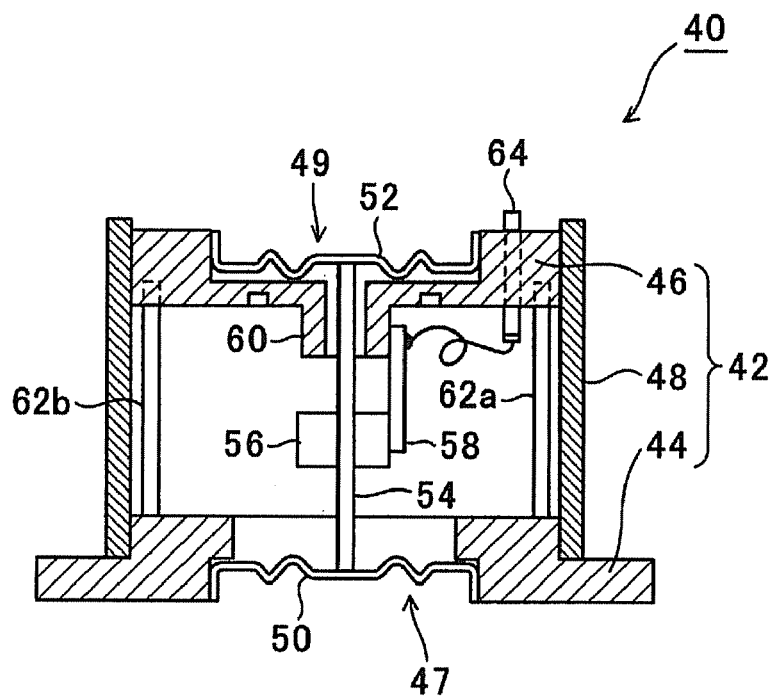
FIG. 6 is a schematic sectional view showing a pressure sensor according to a third embodiment of the invention.
Figure 7:
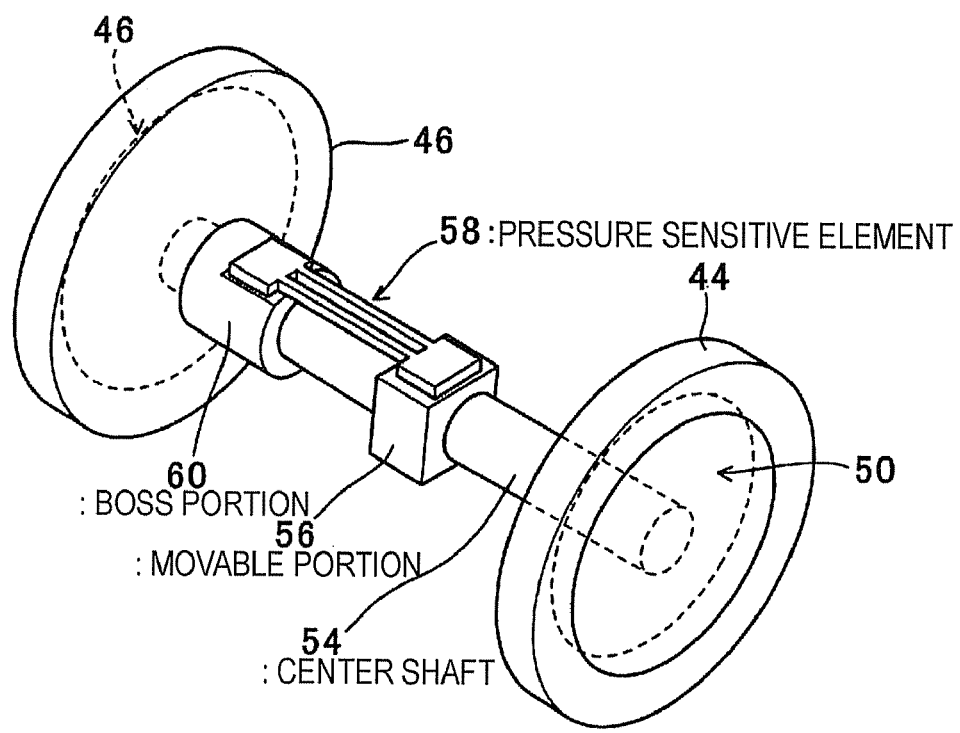
FIG. 7 is a perspective view showing a major part of the pressure sensor.
Figure 8:
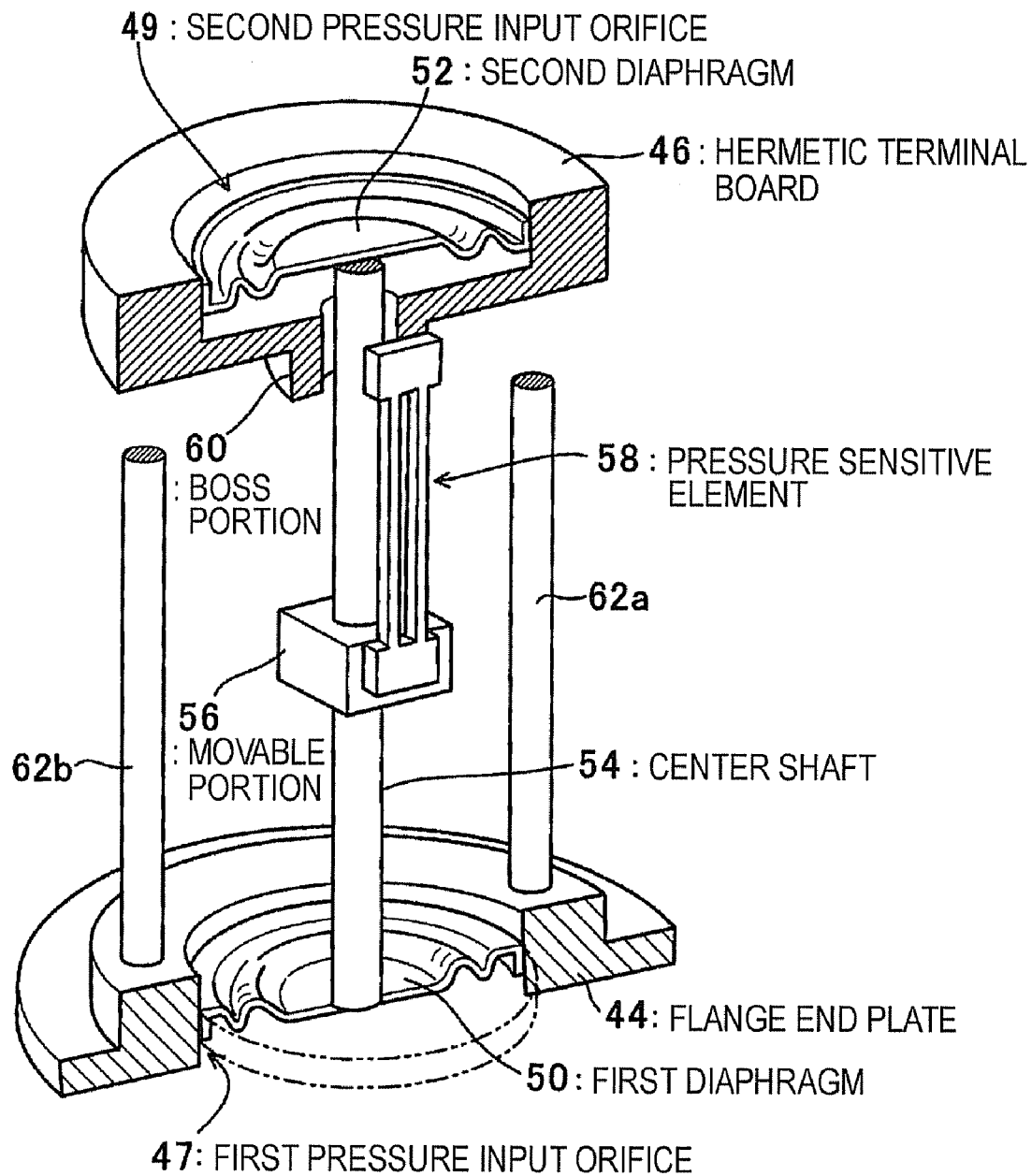
FIG. 8 is a perspective view showing a fracture of a part of the pressure sensor.

FIG. 6 is a schematic view showing a pressure sensor 40 according to a third embodiment. FIG. 7 is a perspective view showing a major component of the pressure sensor. FIG. 8 is a perspective view showing a fracture of a part of the pressure sensor. An example shown in the figures is a modification of the pressure sensor for detecting the differential pressure, described in the first embodiment.

The pressure sensor 40 includes a housing 42 that is a hollow cylindrical chassis. This housing 42 is composed of a flange end plate 44 as a first case (a lower end plate), a hermetic terminal board 46 as a second case (an upper end plate), and a cylinder sidewall 48 as a third case surrounding the circumference of the end plates that are disposed at a distance, so as to be a hollow airtight container. On the flange end plate 44 and the hermetic terminal board 46, a first pressure input orifice 47 and a second pressure input orifice 49 communicating with an internal space are respectively formed coaxially with an axis core of the housing 42 so as to open to the outside. The openings are respectively closed by a first diaphragm 50 and a second diaphragm 52 that are joined in an integrated fashion respectively with the flange end plate 44 and the hermetic terminal board 46. The first diaphragm 50 on the flange end plate 44 is used for receiving pressure, and the second diaphragm 52 on the hermetic terminal board 46 are used for setting atmospheric pressure. As is the case with the first embodiment, the housing 42 is closed and the internal space is maintained to be vacuumed by an air vent unit which is not shown.

Inside the housing 42, a center shaft (a force transmitting unit) 54 is disposed along a core axis of the housing 42. The center shaft 54 couples center areas of the first and second diaphragms 50 and 52 so as to bond and connect the diaphragms 50 and 52. At the intermediate part of the center shaft 54, a movable portion 56 serving as a piezoelectric element pedestal is provided in an integrated manner. To the movable portion 56, one end portion of a pressure sensitive element 58 composed of a double-ended tuning fork resonator is attached. A detecting axis of the pressure sensitive element 58 is set to be parallel to an axis orthogonal to pressure receiving surfaces of the diaphragm 50 and 52. The other end portion of the pressure sensitive element 58 is connected with a boss part 60 serving as a pressure sensitive element pedestal and provided to the hermetic terminal board 46 of the housing 42 in a manner protruding inside. With this structure, the center shaft 54 moves in an axis direction due to the differential pressure between the first diaphragm 50 for receiving pressure and the second diaphragm 52 for atmospheric pressure, following a change of a position of the movable portion 56. The force of the change generates an acting force of the pressure sensitive element 58 in the detecting axis direction.

Inside the housing 42, the supporting poles 62a and 62b that are a plurality of guide shafts are disposed in parallel with the center shaft 54 in a manner interposing the center shaft 54 therebetween. Likewise the first embodiment, the poles 62a and 62b keep a constant distance between the flange end plate 44 that is the first case and the hermetic terminal board 46 that is the second case so as to prevent degradation of the detecting accuracy caused by deformation of the housing 42 by external force or an arbitrary posture.

In this third embodiment, a hermetic terminal 64 is provided to the hermetic terminal board 46 serving as the upper end plate in a manner penetrating the hermetic terminal board 64. With this structure, a signal of the pressure sensitive element 58 is extracted to the outside.

According to the third embodiment, a pair of the diaphragms 50 and 52 is coupled with each other by the center shaft 54, and the movable portion 56 provided on the intermediate part of the center shaft 54 moves in accordance with behaviors of the diaphragms 50 and 52 in a shaft axis direction (this is a move caused by the differential pressure between the pair of the diaphragms 50 and 52). The move of the movable portion 56 corresponds to a force acting in the detecting axis direction of the pressure sensitive element 58 that is the double-ended tuning fork resonator. Therefore, a pressure sensor having high detecting accuracy can be structured without using oil. Thus the sensor is miniaturized and easily assembled. Further, the housing 42 that is a vacuumed container is composed of the flange end plate 44, the hermetic terminal board 46, and the cylinder sidewall 48, the flange end plate 44 and the first diaphragm 50 are formed in an integrated manner, and the hermetic terminal board 46 and the second diaphragm 62 are formed in an integrated manner. Accordingly, the sensor can be assembled in a simple and easy way. In order to attach the pressure sensor 40 to a container that is sunk (immersed) in an object liquid for a measurement, the flange end plate 44 is bonded to the container for the object liquid for measurement through an o ring disposed surrounding a periphery of the first diaphragm 50, and bolted. This attaching operation does not require screwing by a pipe sleeve provided with a diaphragm that is coupled with a center shaft, being able to prevent such a defect that a tensile force caused by a stretch of the center shaft is applied to a pressure sensitive element.

In the third embodiment as well, the center shaft 54 and the movable portion 56 serving as a pressure sensitive element fixing board may be an integrated body formed by cutting and processing one material member. Accordingly, the movable portion 56 is prevented from moving or deviating from the fixing portion of the shaft.

FIG. 9 shows a manufacturing process according to the third embodiment. As shown in FIG. 9A, the hermetic terminal board 46 is supported by a jig A and the second diaphragm 52 is bonded to the pressure input orifice 49 by welding. Meanwhile, the flange end plate 74 is supported by a jig B, and the first diaphragm 50 is welded to the pressure input orifice 47, as shown in FIG. 9B. Then the center shaft 54 is bonded in an orthogonal manner to the inner center portion of the second diaphragm 52, which is attached to the hermetic terminal board 46, with the positioning jig 25 which is shown in FIG. 4. As shown in FIG. 9C, the positioning jig 25 is attached to the boss portion 60 of the hermetic terminal board 46, and the center shaft 54 having an end to which an adhesive is applied is inserted and positioned so as to dispose the shaft 54 in an orthogonal manner to the center portion of the diaphragm 52. The flange end plate 44 is sandwiched and supported by the jig B and a jig C having inserting through holes for the supporting poles 62 (62a and 62b) that are guide shafts. In this state, the supporting poles 62 are inserted so as to be attached to the flange end plate 44 in a manner embedding their ends in the plate 44, as shown in FIG. 9D.

In such a state that the flange end plate 44 and the hermetic terminal board 46 are opposed to each other, as shown in FIG. 9E, the ends of the guide shafts (supporting poles) 62 are embedded and bonded to the hermetic terminal board 46 and the other end of the center shaft 54 is bonded to the central portion of the first diaphragm 50 provided to the flange end plate 44. The flange end plate 44 and the hermetic terminal board 46 are positioned and attached by using the jigs A, B, and C. After that, the jigs A, B, and C are removed. With respect to the flange end plate 44 and the hermetic terminal board 46 that are integrated, the movable portion 56 is attached at the center shaft 54. Here, a height adjusting jig D is used so as to keep the height from the flange end plate 44 in a predetermined height. The jig D has an L shape, and is composed of a height adjusting pedestal portion and a position keep backboard portion. The height adjusting pedestal portion fits a space between an upper end surface of the flange end plate 44 and a lower surface of the movable portion 56. The position keep backboard portion positions and keeps the pedestal portion to the hermetic terminal board 46. The height is adjusted by the thickness of the pedestal, and the backboard maintains the flange end plate 44 and the hermetic terminal board 46 at a predetermined distance.

Then, as shown in FIG. 9F, the pressure sensitive element 58 is attached between the boss portion 60 of the hermetic terminal board 46 and the movable portion 56 on the center shaft 54 so as to have a detecting axis parallel with the core axis of the center shaft 54. Subsequently, after wiring processing is performed, the cylinder sidewall 48 is attached so as to seal the inside and vacuum the inside so as to be blocked. Finally, as shown in FIG. 9G, an IC is mounted on an outer end surface portion of the hermetic terminal board 46 and a lid is attached, completing the sensor.

Thus a pressure sensor that shows high detecting accuracy and has a simple structure can be manufactured without using oil.

Fourth Embodiment

Figure 10:
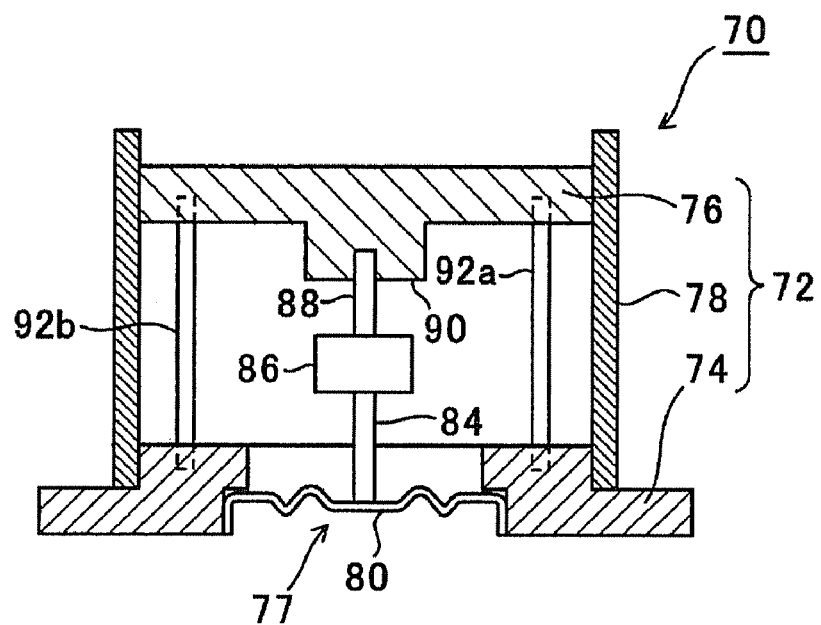
FIG. 10 is a schematic sectional view showing a pressure sensor according to a fourth embodiment.
Figure 11:
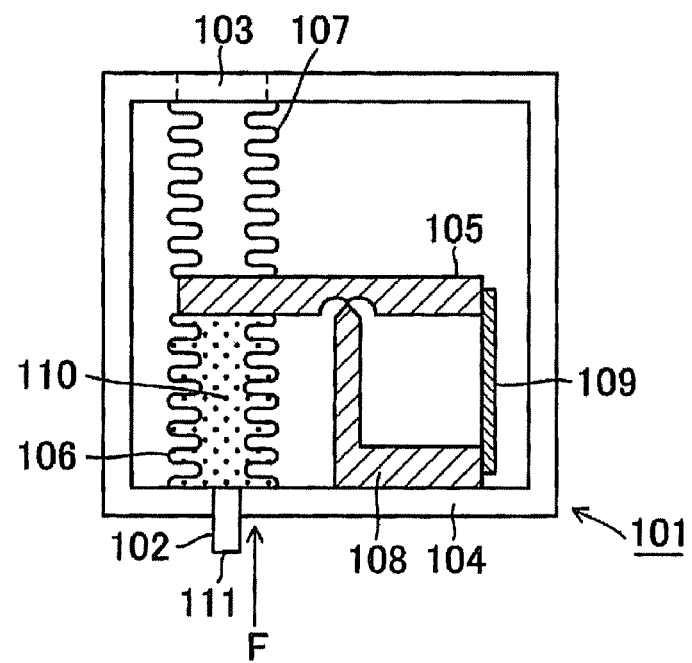
FIG. 11 is a sectional view illustrating a related art pressure sensor.

FIG. 10 is a sectional view showing a pressure sensor 70 according to a fourth embodiment. An example shown in the figure is a modification of the pressure sensor, shown in the second embodiment, for detecting absolute pressure. The difference from the second embodiment is that a center shaft and a pressure sensitive element are disposed coaxially so as to be disposed on an axis that passes through a center area of a pressure receiving diaphragm.

The pressure sensor 70 includes a housing 72 that is a hollow cylindrical chassis. This housing 72 is composed of a flange end plate 74 as a first case (a lower end plate), a hermetic terminal board 76 as a second case (an upper end plate), and a cylinder sidewall 78 as a third case surrounding the circumference of the end plates that are disposed at a distance, so as to be a hollow sealing container. A pressure input orifice 77 communicating with the inner space is formed coaxially with the housing 72 to penetrate the flange end plate 74, opening outside. The opening is closed by a first diaphragm 80 and the diaphragm 80 is connected with the flange end plate 74 in an integrated manner. The diaphragm 80 is used for receiving pressure of an object liquid for measurement. The hermetic terminal board 76 is an end plate that includes neither a pressure input orifice nor a diaphragm. As is the case with other embodiments, the housing 72 is closed and the internal space is maintained to be vacuumed by an air vent unit which is not shown.

Inside the housing 72, a center shaft (a force transmitting unit) 84 is provided in an orthogonal manner to a center area of an inner surface of the diaphragm 80 coaxially with the axis core of the housing 42. To an end portion of the center shaft 84, a movable portion 86 serving as a pressure sensitive element pedestal is provided in an integrated manner with the shaft 84. To the movable portion 86, one end portion of a pressure sensitive element 88 that is a double-ended tuning fork resonator is attached in such manner that a detecting axis of the element 88 is coaxial with the center shaft 84. The other end portion of the pressure sensitive element 88 is connected with a pedestal 90 protruding inside and provided to a center area of the hermetic terminal board 76 of the housing 72. Accordingly, when the diaphragm 80 for receiving pressure bends due to an application of pressure of an object liquid for measurement, the center shaft 84 moves in an axis direction, following a generation of an acting force of the pressure sensitive element 88 connected with the movable portion 86.

Inside the housing 72, supporting poles 92a and 92b that are a plurality of guide shafts are disposed in parallel with the center shaft 84 in a manner interposing the center shaft 84 therebetween. Likewise other embodiments, the poles 92a and 92b keep a constant distance between the flange end plate 74 that is the first case and the hermetic terminal board 76 that is the second case so as to prevent degradation of the detecting accuracy caused by deformation of the housing 42 due to an external force or an arbitrary posture.

As is the case with the third embodiment, this fourth embodiment has such a structure that a hermetic terminal which is not shown is provided to the hermetic terminal board 76 serving as the upper end plate in a manner penetrating the hermetic terminal board 76. With this structure, a signal of the pressure sensitive element 88 is extracted to the outside.

According to the fourth embodiment, the housing 72 is composed of the flange end plate 74, the hermetic terminal board 76, and the cylinder sidewall 78, and the flange end plate 74 and the diaphragm 80 are formed in an integrated manner. Thus the sensor is easily assembled. The diaphragm 80 for receiving pressure and the center shaft 84 are connected in alignment with each other in a concentric manner, and the movable portion 86 provided to the end portion of the center shaft 84 moves in a shaft axis direction in accordance with a behavior of the diaphragm 80, generating a force acting in the detecting axis direction of the pressure sensitive element 88 that is a double-ended tuning fork resonator. Therefore, a pressure sensor having high detecting accuracy can be structured without using oil. Thus the sensor is miniaturized and easily assembled.

In the fourth embodiment as well, the center shaft 84 and the movable portion 86 serving as a pressure sensitive element fixing pedestal may be an integrated body formed by cutting and processing one material member. Accordingly, the movable portion 86 is prevented from moving or deviating from the fixing portion of the shaft.

The entire disclosure of Japanese Patent Application No. 2009-006884, filed Jan. 15, 2009 is expressly incorporated by reference herein.

What is claimed is:

1. A pressure sensor, comprising:
   a housing;
   an attachment portion coupled to the housing and having a pressure input orifice;
   a diaphragm sealing the pressure input orifice of the attachment portion and having a first surface that is a pressure receiving surface; and
   a pressure sensitive unit having a detecting axis in a direction in which a force is detected,
   wherein an end of the pressure sensitive unit is connected to a central area of a second surface of the diaphragm, another end of the pressure sensitive unit is connected to the housing, and the detecting axis is approximately orthogonal to the pressure receiving surface.

2. The pressure sensor according to claim 1, wherein the pressure sensitive unit comprises:
   a force transmitting unit of which one end contacts with the central area of the second surface of the diaphragm,
   a movable unit fixed on the force transmitting unit, and
   a pressure sensitive element of which a first end portion is connected to the movable unit and a second end portion is connected to the housing.

3. The pressure sensor according to claim 2, wherein the force transmitting unit is a shaft.

4. The pressure sensor according to claim 2, wherein the pressure sensitive element includes base portions on both end portions thereof, and a vibrating portion between the base portions provided on the both end portions.

5. The pressure sensor according to claim 1, wherein a material of the diaphragm is one of metal, ceramic, and piezoelectric crystal.

6. The pressure sensor according to claim 3, wherein a material of the shaft is one of stainless, aluminum, and ceramic.

7. The pressure sensor according to claim 1, wherein a material of the housing is one of stainless, aluminum, and ceramic.

8. A pressure sensor, comprising:
   a housing having a pressure input orifice;
   a diaphragm sealing the pressure input orifice of the housing and having an outer surface that is a pressure receiving surface; and
   a pressure sensitive unit of which an end is connected to a central area of an inner surface of the diaphragm, another end is connected to the housing, and a detecting axis is set along an axis orthogonal to the pressure receiving surface of the diaphragm, in the housing.

9. The pressure sensor according to claim 8, wherein the pressure sensitive unit is composed of a force transmitting unit connected orthogonal to the diaphragm and a pressure sensitive element of which one end is connected to the force transmitting unit and the other end is connected to a wall surface of the housing.

10. The pressure sensor according to claim 8, wherein a guide shaft is provided inside the housing in parallel with the detecting axis.

11. A pressure sensor, comprising:
    a housing;
    a pressure input orifice coaxially formed on one of opposed wall surfaces of the housing;
    a diaphragm sealing the pressure input orifice and having an outer surface that is a pressure receiving surface;
    a force transmitting unit connected to a central area of an inner surface of the diaphragm in the housing; and
    a pressure sensitive element of which one end is connected to the force transmitting unit, the other end is connected to the housing, and a detecting axis is set along an axis orthogonal to the pressure receiving surface of the diaphragm, in the housing.

12. The pressure sensor according to claim 11, wherein the force transmitting unit is a shaft, and the pressure sensitive element is disposed in parallel with the shaft.

13. The pressure sensor according to claim 11, wherein the force transmitting unit is a shaft, and the pressure sensitive element is disposed coaxially with the shaft.

14. A pressure sensor, comprising:
   a housing;
   a pair of pressure input orifices coaxially formed on opposed wall surfaces of the housing;
   first and second diaphragms respectively sealing the pressure input orifices and having an outer surface that is a pressure receiving surface;
   a force transmitting unit coupling central areas of inner surfaces of the first and second diaphragms in the housing; and
   a pressure sensitive element of which one end is connected to an intermediate portion of the force transmitting unit, the other end is connected to the housing, and a detecting axis is set parallel to an axis orthogonal to the pressure receiving surface of the diaphragm.

* * * * *